United States Patent
Wernersson (10) Patent No.: US 7,918,614 B2
(45) Date of Patent: Apr. 5, 2011

(54) CAMERA FOR ELECTRONIC DEVICE

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 698 days.

(21) Appl. No.: 11/482,323

(22) Filed: Jul. 7, 2006

(65) Prior Publication Data

US 2007/0172230 A1    Jul. 26, 2007

Related U.S. Application Data

(60) Provisional application No. 60/760,899, filed on Jan. 20, 2006.

(51) Int. Cl.
*G03B 7/00* (2006.01)
*G03B 17/00* (2006.01)

(52) U.S. Cl. .......................... 396/439; 396/213

(58) Field of Classification Search .......... 396/50, 396/149, 213, 374, 377, 439; 348/14.16, 348/222.1
See application file for complete search history.

(56) References Cited

U.S. PATENT DOCUMENTS

| | | | |
|---|---|---|---|
| 5,949,504 A | 9/1999 | Kim | |
| 6,191,827 B1 * | 2/2001 | Segman et al. | 348/746 |
| 6,285,400 B1 | 9/2001 | Hokari | |
| 6,806,903 B1 * | 10/2004 | Okisu et al. | 348/254 |
| 7,065,261 B1 * | 6/2006 | Horie | 382/289 |
| 7,619,663 B2 * | 11/2009 | Sakurai et al. | 348/241 |
| 2002/0113884 A1 | 8/2002 | Tanii | |

FOREIGN PATENT DOCUMENTS

| | | |
|---|---|---|
| EP | 1 158 786 A2 | 11/2001 |
| EP | 1524841 (A1) | 4/2005 |
| EP | 1 608 135 A1 | 12/2005 |
| GB | 2 400 261 A | 10/2004 |
| JP | 2-103023 | 4/1990 |
| JP | 10-145667 A | 5/1998 |
| JP | 2000-138846 (A) | 5/2000 |
| JP | A 2005-503080 | 1/2005 |
| JP | A 2005-110202 | 4/2005 |
| JP | A 2005-258718 | 9/2005 |
| JP | A 2005-347416 | 12/2005 |
| RU | 2199828 (C2) | 2/2003 |

OTHER PUBLICATIONS

Communication pursuant to Article 94(3) EPC for Application No. 07 703 833.9—1241 dated Nov. 12, 2009.
First Chinese Office Action for Patent Application No. 200680051326.0 dated Aug. 11, 2006. CPPH0830617P.
Decision on Grant of Application No. 2008134116(043166), Russian Patent Office Oct. 28, 2010.

* cited by examiner

*Primary Examiner* — Rodney E Fuller
(74) *Attorney, Agent, or Firm* — Myers, Bigel, Sibley & Sajovec (57) ABSTRACT

A digital camera includes a support structure, a lens carried by the support structure and having an optical axis, a detector, carried by the support structure under the lens and including a number of adjacent pixel rows. Each pixel row includes a number of pixels, and each pixel includes an image sensor. An image signal processor unit is connected to the detector, and includes an image scaler configured to scale each row of pixels by one of a plurality of respective scale factors which is different from the respective scale factor of an adjacent row of pixels.

23 Claims, 7 Drawing Sheets

CAMERA FOR ELECTRONIC DEVICE

RELATED APPLICATION

This application claims the benefit of and priority to U.S. Provisional Patent Application No. 60/760,899 titled "Camera for Electronic Device", filed Jan. 20, 2006, the disclosure of which is hereby incorporated herein by reference as if set forth in its entirety.

FIELD OF THE INVENTION

The present invention relates to a camera for use in an electronic device, such as a camera incorporated in a radio communication terminal for use in video telephony. More particularly, the invention relates to a solution for adjusting the viewing direction of a camera of an electronic device carrying a display.

BACKGROUND

The cellular telephone industry has had an enormous development in the world in the past decades. From the initial analog systems, such as those defined by the standards AMPS (Advanced Mobile Phone System) and NMT (Nordic Mobile Telephone), the development has during recent years been almost exclusively focused on standards for digital solutions for cellular radio network systems, such as D-AMPS (e.g., as specified in EIA/TIA-IS-54-B and IS-136) and GSM (Global System for Mobile Communications). Currently, the cellular technology is entering the so called 3rd generation (3G) by means of communication systems such as WCDMA, providing several advantages over the 2nd generation digital systems referred to above.

Many of the advances made in mobile phone technology are related to functional features, such as better displays, more efficient and longer lasting batteries, and means for generating polyphonic ring signals. One functional feature which has become more and more common is built-in cameras. Cameras with video camera functionality are available today in several mobile phones. With the entrance of high bit-rate services, such as EDGE (Enhanced Data-rates for GSM) and 3G, the availability and usability for video-related services will increase. In particular, mobile video telephony, with simultaneous communication of sound and moving images, has recently become commercially available.

For stationary use, video conference systems generally include a camera mounted on or beside a communication terminal, such as a personal computer (PC), or integrated in an internet protocol (IP) enabled phone. Use of such a system may be fairly straightforward, as the user is positioned in front of the terminal with the camera aiming towards the user. However, mobile video conferencing is a bit more cumbersome. The terminal may be positioned in a support unit on a desktop, from which a camera in the unit is aimed towards the object of interest to be captured, typically the user. A more common way of using a mobile phone for video conferencing with face to face transmission is when it is held, such that the built-in camera is manually aimed towards the user. When communicating through a mobile handheld terminal, the user therefore may hold the terminal steady in front of the face so that the receiving party can see the face of the user, i.e. the sending party.

A problem related to video conferencing with a radio terminal is caused by the fact that the built-in camera typically is placed adjacent to and parallel with the display, i.e. the optical axis of the camera is perpendicular to the display surface. The terminal therefore has to be aimed more or less 90° to the face, in order to get a proper image of the user. However, many users find this way of holding the terminal uncomfortable. Furthermore, for most mobile phone designs it may be difficult to use the terminal when placed on a desktop without additional supporting means, since it may require that the user's face be held over the terminal. A related problem is that the terminal may also include a small lamp aimed parallel with the camera to provide light to the object to be captured. When the camera, and the lamp, is aimed towards the face of the user at a 90° angle, there is also a risk that reflections of the user's face in the display surface will disturb the images presented on the display.

Even in the case a camera is configured such that it may be held at an angle to the object to be captured, such as the face of a user of the camera, a problem of image perspective distortion occurs. This may lead to problems when true representation of object dimensions is crucial. For the case of video telephony, the captured image of the user's face will tend to show a wider chin portion compared to the upper part of the face, if the camera is held at a slanted angle away from the face.

SUMMARY

According to some embodiments of the invention, a digital camera includes a support structure, a lens carried by the support structure and having an optical axis, a detector, carried by the support structure under the lens and comprising a number of adjacent pixel rows, where each pixel row comprises a number of pixels, and each pixel includes an image sensor, and an image signal processor unit connected to the detector, including an image scaler configured to scale each row of pixels by one of a plurality of respective scale factors, each respective scale factor being different from the scale factor of an adjacent row of pixels According to some embodiments of the invention, the image scaler is configured to scale each row of pixels by a scale factor having a magnitude which is proportional to the position of the row between a start row and an end row.

According to some embodiments of the invention, the image scaler is configured to be responsive to input of a start row scale factor and an end row scale factor, and comprises a calculator function configured to calculate the scale factors for each row between the start row and the end row.

According to some embodiments of the invention, the image scaler is configured to calculate an input row length for a pixel row as a ratio between desired output row length, common to all pixel rows, and the scale factor for that row, and the image scaler is configured to determine a position in a predetermined image format of an output pixel of a certain pixel row, to determine the corresponding position in the detected image by inverse scaling using the scale factor for the certain row, and to determine an intensity value for the output pixel by interpolation of intensity values as detected by pixels adjacent to the corresponding position in the detected image configured to scale image signals detected by the pixels of that row, and which are within the input pixel row length, to the desired output row length.

According to some embodiments, the image scaler is configured to produce an output image with centered rows.

According to some embodiments, the image scaler is configured to calculate a centre starting point for each input row from the detector using a formula of:

$$start_n = \frac{l - l_n}{2},$$

where $start_n$ is the first pixel to process in row n; l is the number of pixels in the full row; and $l_n$ is the number of pixels to process in row n.

According to some embodiments, a camera module is formed by the support structure, and where the image signal processor is included in the camera module.

According to some embodiments, the image scaler is configured to determine a position in a predetermined image format of an output pixel of a certain pixel row, to determine the corresponding position in the detected image by inverse scaling using the scale factor for the certain row, and to determine an intensity value for the output pixel by interpolation of intensity values as detected by pixels adjacent to the corresponding position in the detected image.

According to some embodiments, the image scaler is configured to calculate scale factors dependent on a preset expected slanting angle between an image plane of the detector and an object to capture an image of.

According to some embodiments, a field of view of the camera is defined by an operative detector surface region, which is displaced off-center in relation to the optical axis of the lens.

According to some embodiments, the image scaler is configured to calculate scale factors $S_n$ for each row n through function $S_n=m+n*k$, where m and k are constants.

According to further embodiments, an electronic device includes a housing; and a digital camera module including a support structure, a lens carried by the support structure and having an optical axis, a detector, carried by the support structure under the lens, comprising a number of adjacent pixel rows, where each pixel row comprises a number of pixels, and each pixel includes an image sensor, an image signal processor unit connected to the detector, including an image scaler configured to scale each row of pixels by a scale factor which is different from an adjacent row of pixels.

In some embodiments, the electronic device comprises a radio signal transceiver, and a control unit configured to provide a scaled video signal from the digital camera module to the radio signal transceiver.

In some embodiments, the electronic device comprises a display, configured to present a scaled image as provided by the digital camera module.

According to further embodiments, a method for capturing an image using a digital camera includes aiming the camera at an object; detecting image signals in a detector comprising a number of adjacent pixel rows, where each pixel row comprises a number of pixels, and each pixel includes an image sensor, processing the detected image signals by scaling each row of pixels by a scale factor which is different from an adjacent row of pixels to provide a scaled image; and outputting the scaled image.

In some embodiments, methods include scaling each row of pixels by a scale factor having a magnitude which is proportional to the position of the row between a start row and an end row.

In some embodiments, methods include defining a start row scale factor and an end row scale factor; and calculating the scale factors for each row between the start row and the end row.

In some embodiments, methods include calculating an input row length for a pixel row as a ratio between desired output row length, common to all pixel rows, and the scale factor for that row, and scaling image signals detected by the pixels of that row, and which are within the input pixel row length, to the desired output row length.

In some embodiments, methods include providing a scaled image with centered rows.

In some embodiments, methods include calculating a centre starting point for each input row from the detector using a formula of:

$$start_n = \frac{l - l_n}{2},$$

where $start_n$ is the first pixel to process in row n; l is the number of pixels in the full row; and $l_n$ is the number of pixels to process in row n.

In some embodiments, methods include processing the detected image by means of an image signal processor integral with the digital camera in a camera module of an electronic device.

In some embodiments, methods include transmitting the scaled image to a remote receiver using a radio transceiver of a radio communication terminal.

In some embodiments, methods include presenting the scaled image on a display.

In some embodiments, methods include defining an image format; determining a position in the image format of an output pixel of a certain pixel row; determining a corresponding position in the detected image by inverse scaling using the scale factor for the certain row; determining an intensity value for the output pixel by interpolation of intensity values as detected by pixels adjacent to the corresponding position in the detected image.

In some embodiments, methods include calculating scale factors dependent on a preset expected slanting angle between an image plane of the detector and an object to capture an image of.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Embodiments according to the present invention are described with reference to block diagrams and/or operational illustrations of methods, mobile terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present description relates to the field of electronic devices including a camera and a display for presenting pictures captured by the camera, which are arranged such that a user may view the display while the camera is aimed at the same user. Some embodiments of the invention relate to a communication terminal configured for video telephony. Such a communication terminal may, for example, be a DECT (Digital European Cordless Telephone) telephone connectable to a PSTN (Public Switched Telephone Network) wall outlet by means of a cord, or an IP telephone having a housing including a display and a camera. In some embodiments, the communication terminal is a radio communication terminal, such as a mobile phone or mobile terminal operable for communication, for example, through a radio base station and/or directly to another radio terminal. As used herein, a "mobile terminal" includes, but is not limited to, a terminal that is configured to receive communication signals via a wireless interface from, for example, a cellular network, a Wide Area Network, wireless local area network (WLAN), a GPS system, and/or another RF communication device. Example mobile terminals include, but are not limited to, a cellular mobile terminal; a GPS positioning receiver; an acceleration measurement device with a wireless receiver; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver.

Embodiments will now be described with reference to the accompanying drawings.

Figure 1A:
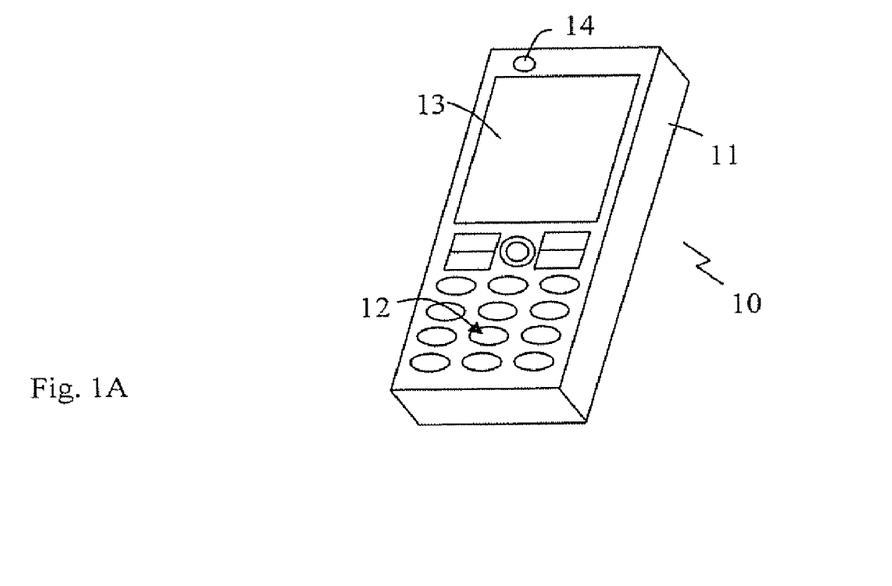
FIGS. 1A and 1B schematically illustrate a hand-held radio communication terminal including a digital camera and a display according to some embodiments of the invention.

FIG. 1A illustrates an electronic device in the form of a portable communication terminal 10, such as a mobile telephone, according to some embodiments of the invention. Terminal 10 includes a support structure 11 including a housing, and a user interface including a keypad or keyboard 12 and a display 13. The terminal 10 may also include an audio interface including a microphone and a speaker, radio transceiver circuitry, an antenna, a battery, and a microprocessor system including associated software and data memory for radio communication, all carried by support structure 11 and contained within the housing. In addition to these elements, device 10 also includes a digital camera 14, an aperture of which is indicated in FIG. 1A.

As shown in FIG. 1A, the aperture of the camera 14 and the display 13 may be arranged such that both are visible from a common viewing location. For example, both the aperture of the camera 14 and the display 13 may be arranged on the same side of the housing 11. This way, the camera 14 may be aimed at a user while the user views the display 13. Accordingly, a communication terminal 10 may be used for video telephony.

Figure 1B:
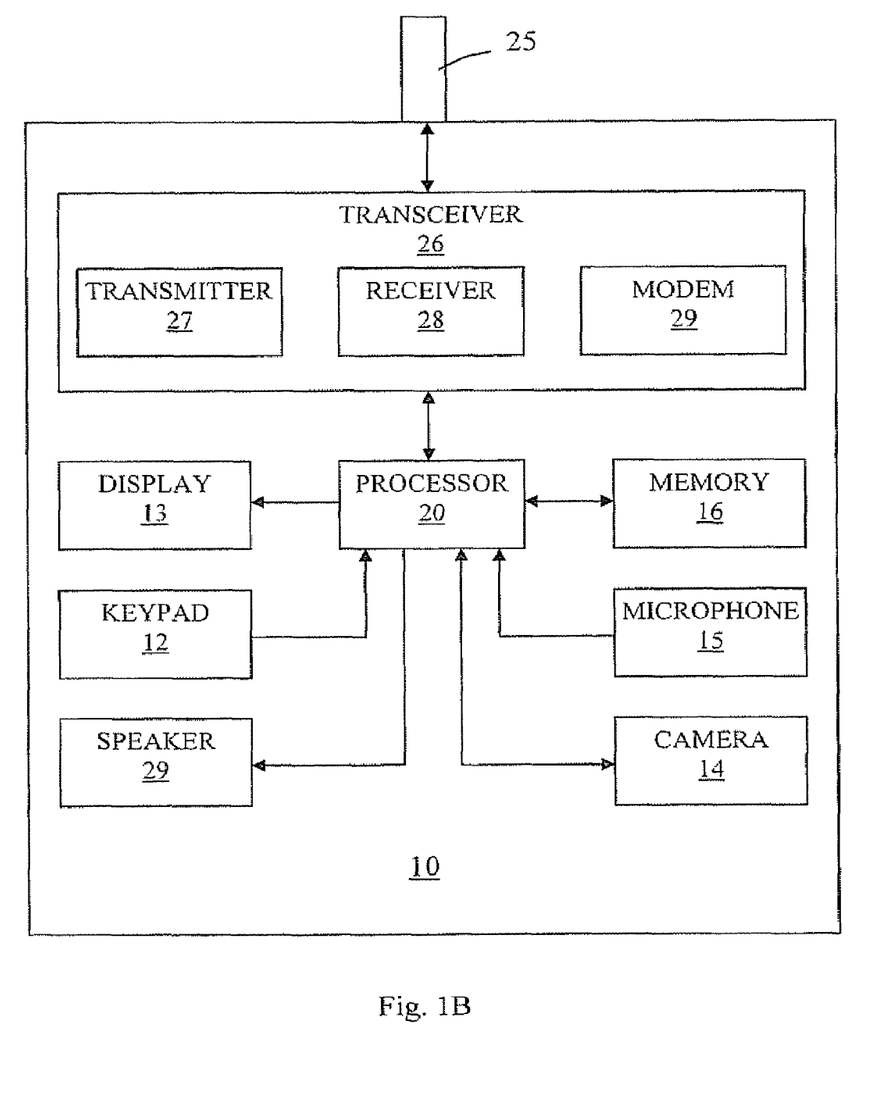

Embodiments of the present invention may be further described with reference to the schematic illustration of a communication terminal 10 shown in FIG. 1B. Referring now to FIG. 1B, an exemplary communication terminal 10, in accordance with some embodiments of the present invention, includes a keypad 12, a display 13, a transceiver 26, a memory 16, a microphone 15, and a speaker 19, and a camera 14 that communicate with a control unit or processor 20. The transceiver 26 typically includes a transmitter circuit 27, a receiver circuit 28, and a modem 29, which cooperate to transmit and receive radio frequency signals to remote transceivers via an antenna 25. The radio frequency signals transmitted between the communication terminal 10 and the remote transceivers may comprise both traffic and control signals (e.g., paging signals/messages for incoming calls), which are used to establish and maintain communication with another party or destination.

The memory 16 may be a general purpose memory that is used to store both program instructions for the processor 20 as well as data, such as audio data, video data, configuration data, and/or other data that may be accessed and/or used by the processor 20. The memory 16 may include a nonvolatile read/write memory, a read-only memory and/or a volatile read/write memory.

Figure 2:
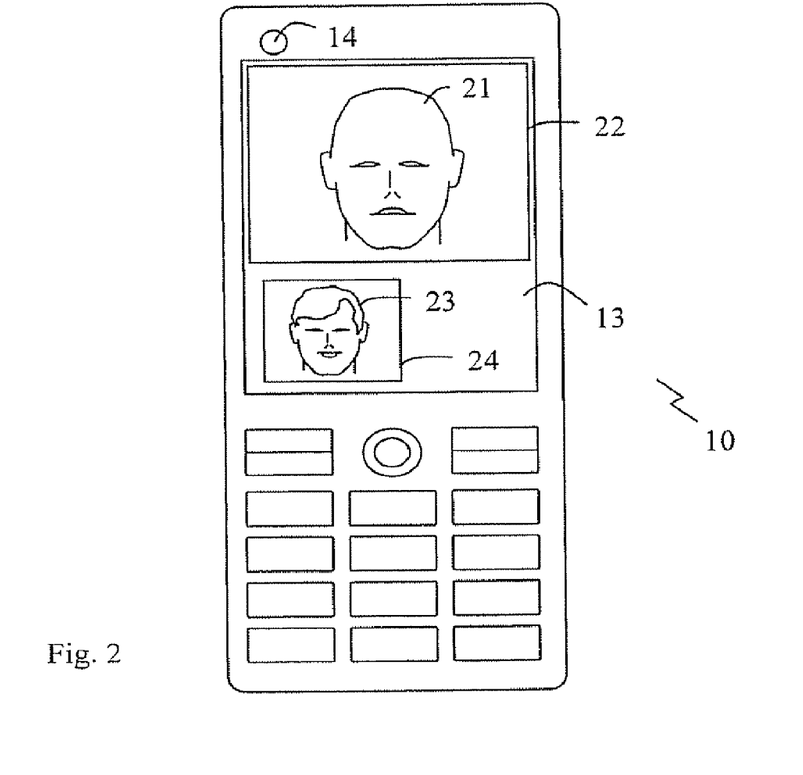
FIG. 2 illustrates the terminal of FIG. 1 when used for videoconferencing according to some embodiments of the invention.

Referring to FIG. 2, the use of a communication terminal 10 for video telephony is illustrated. Typically, in a video telephony session, an image 21 of the remote party is transmitted to the terminal 10 and presented on the display 13 within a dedicated frame 22. At the same time, a smaller image 23 of the user of the terminal 10, captured by the camera 14, may also be presented on display 13 within a frame 24. The frame 24 may be displayed within a separate frame/display of the terminal 10 and/or within a sub-frame of the display 13 as a picture-in-picture. This way, the user may receive visual feedback of how the camera 14 is aimed, and may handle the terminal 10 for proper aiming.

Figure 3:
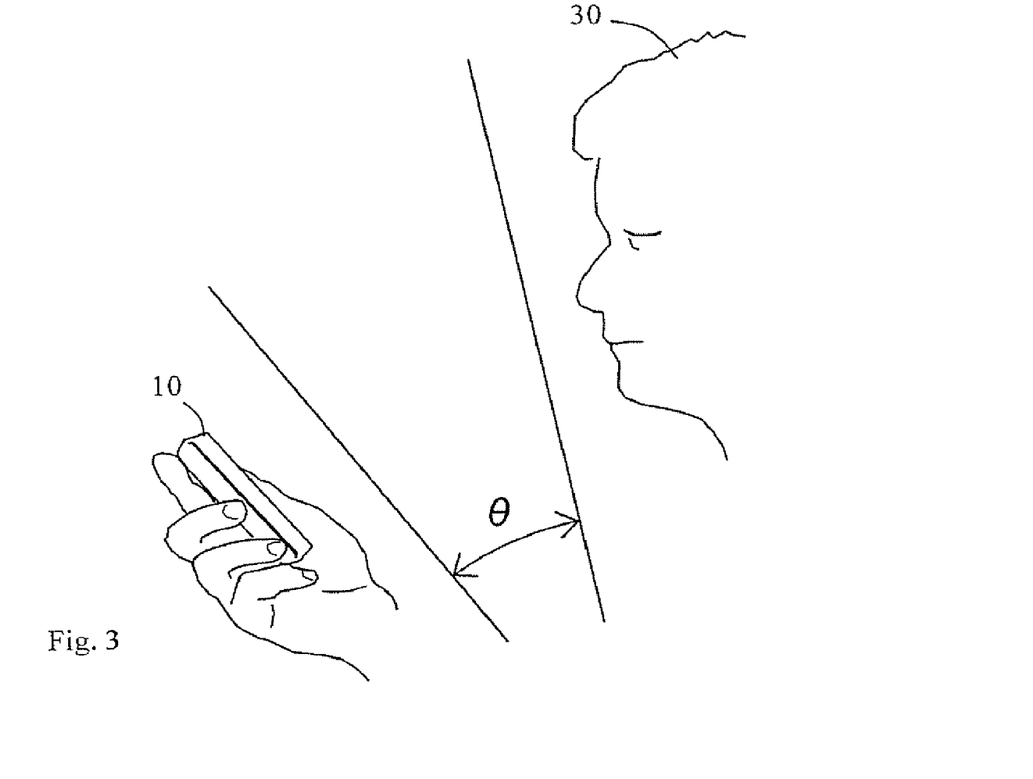
FIG. 3 schematically illustrates how a camera of a terminal is held at an angle to the face of a user according to some embodiments of the invention.

A problem related to video telephony has already been described, namely that it may be more comfortable to hold the terminal 10 at a certain angle to the user 30, marked θ in FIG. 3, rather than parallel to the face of the user. Positioning the terminal 10 at an oblique angle to the object to be imaged, typically the face of the user, may also make it easier to use the terminal 10 for video telephony by placing the terminal on a support, e.g. a desktop surface. However, tilting of a conventional terminal may lead to a displacement effect of the captured image, since the camera may not be aimed correctly. The displacement of the captured image within its dedicated image frame will be visible on display, and of course also for the remote party receiving the captured images. With an increasing angle θ, the face of the user may drop down in the frame. At some point, the face will fall out of the field of view of the camera, which may typically be in the range of 50-70° full angle. With reference to FIGS. 4-14, various embodiments of a camera and an electronic device in the form of a terminal including a camera will now be described, which are configured to capture images at a slanted angle as indicated in FIG. 3. More specifically, a camera configured to capture images from a main line of sight, which is angled with respect to an optical axis of the camera will first be described. Furthermore, a camera and a method will be described for correcting or adjusting the perspective of a captured image, which image is distorted due to the slanting angle.

Figure 4:
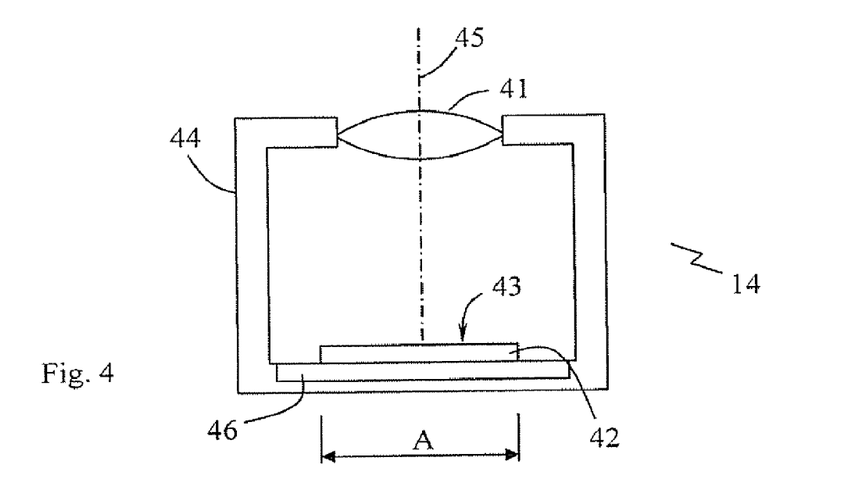
FIG. 4 schematically illustrates a digital camera module according to some embodiments of the invention.

FIG. 4 schematically illustrates a digital camera module 14, for use in an electronic device such as terminal 10 according to some embodiments of the invention. The camera module 14 includes an optical lens 41 including one or more individual lenses made of e.g. plastic or glass, and having an optical axis 45 indicated by the dash-dotted line. A detector 42 with an upper detector surface 43 is positioned at a distance from and parallel to the lens 41 by means of a support member 44, which may include a sealed plastic housing. The camera module may also include an image signal processor (ISP) 46, which may be connected to the backside of the detector 42. Alternatively, the ISP 46 may be connected to detector 42 by wire, e.g. a flex cable. The geometry of the camera module 14, including the focal length and aperture of lens 41 and the size of the image plane defined by detector surface 43 and its position relative to lens 41, defines the field of view of the camera module 14. As used herein, the phrase "main line of sight" will be used to denote the chief ray through lens 41 to the center of the image area used. Typically, the detector surface 43 is positioned centrally under the lens 41, and the main line of sight of the camera 14 therefore coincides with the optical axis 45. The detector surface 43 may generally be rectangular or even square, and may be symmetric about the optical axis 45.

Figure 5:
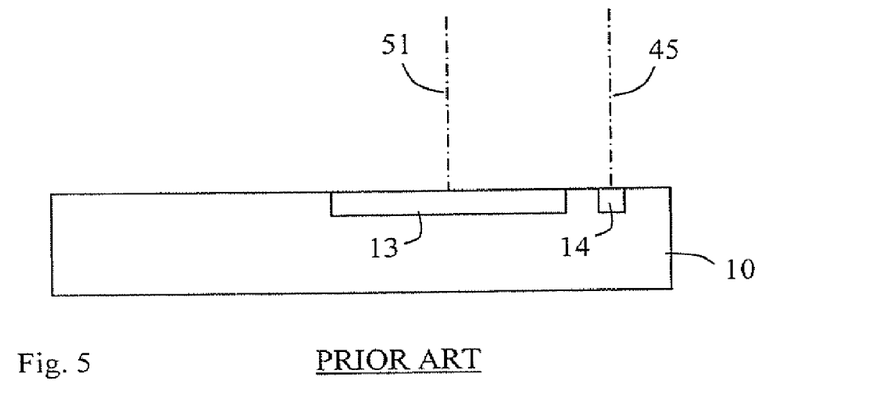
FIG. 5 schematically illustrates a conventional camera phone.

FIG. 5 illustrates a conventional terminal 10 including a camera 14 and a display 13. In FIG. 5, axis 51 indicates the normal direction of display 13, i.e. an axis perpendicular to the surface of display 13. Furthermore, optical axis 45, which represents the main line of sight for the camera 14, is indicated as being substantially parallel to the normal direction 51.

Figure 6:
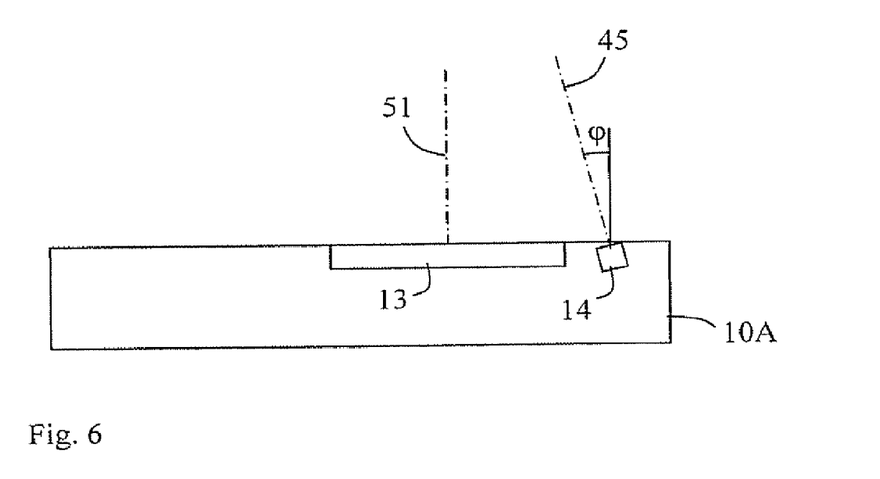
FIG. 6 schematically illustrates some aspects of a camera phone according to some embodiments of the invention.
Figure 7:
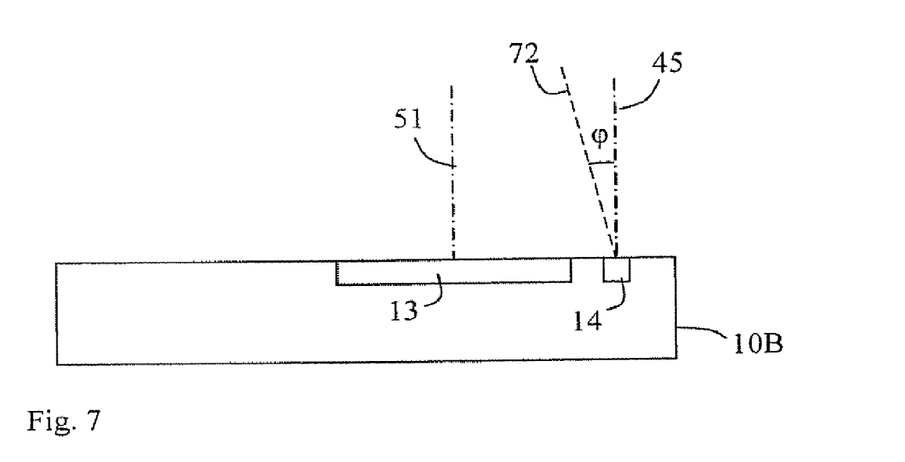
FIG. 7 schematically illustrates some aspects of a camera phone according to further embodiments of the invention.

FIGS. 6-7 illustrate terminals 10A, 10B according to some embodiments of the invention in a simplified side view in which only the display 13 and the camera 14 are illustrated. FIG. 6 illustrates a terminal 10A in which the camera 14 has been tilted such that its optical axis and main line of sight 45 is angled relative to the normal direction 51 by an acute angle φ. In some embodiments, the camera 14 may be tilted an angle φ which corresponds to a desired operation angle θ as indicated in FIG. 3. This way, the terminal 10A may be used for video telephony when held at an angle to the user without displacing the captured image. However, in these embodiments, since the camera 14 is tilted, it may occupy more space in the terminal 10A. Furthermore, fastening of the camera 14 onto e.g. a PCB (Printed Circuit Board) in a tilted orientation in the terminal 10A may require additional mounting apparatus, such as an intermediate wedge element.

FIG. 7 illustrates a terminal 10B according to further embodiments of the invention in which reference numeral 51 indicates the normal direction of the display 13, i.e. an axis perpendicular to the surface of the display 13. Furthermore, the optical axis 45 of a camera 71 is indicated as being substantially parallel to the normal direction 51. The camera 71 may be fastened inside the terminal 10B substantially parallel to the display 13, e.g. by soldering or other type of bonding and connection to a common PCB. However, the field of view of the camera 71, having a main line of sight 72, is defined by an operative region of the detector surface 43 which may be displaced off-center in relation to the optical axis 45 of the lens (see FIG. 4). The operative region may be the full area of the detector surface 43, wherein the entire detector surface is off-centered. Alternatively, the operative region may be an off-center portion of an otherwise centered detector surface 43, in which case the camera 71 may be substantially similar to the camera 14 in terms of the elements shown. The difference lies in which pixels of the detector surface are used for reading out the image.

Figure 8:
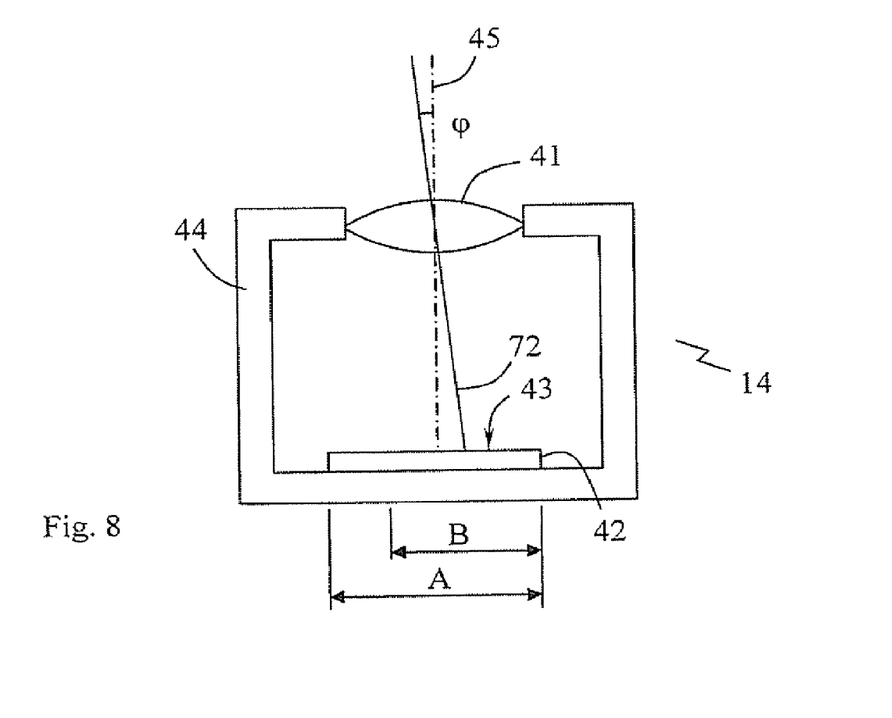
FIGS. 8 and 9 schematically illustrate a digital camera module according to some embodiments of the invention.
Figure 9:
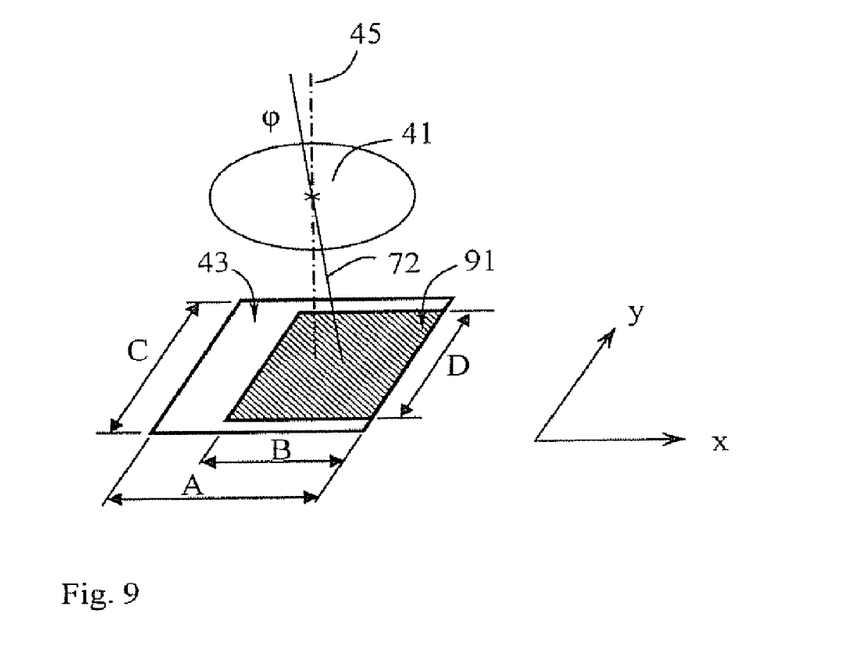

FIGS. 8 and 9 schematically illustrate some aspects of a camera 71 according to some embodiments of the invention. References used in FIG. 4 are also used in FIGS. 8 and 9 for corresponding elements. The ISP 46 is left out of FIGS. 8 and 9, since it need not be mechanically attached directly to the camera module 71. FIG. 8 is a side view of the camera 71, and FIG. 9 is a perspective view of the camera 71 in which the support member 44 has been left out for the sake of simplicity.

The detector 42 may include an image sensor having a full size detector surface 43 within the area defined by length A and width C, and may include a number of pixels, e.g. 400× 400, 640×480, or any other matrix arrangement. In this embodiment, though, an operative region 91 of the detector surface 43 is defined, which includes only a subset of the full number of pixels. In the illustrated example, the region 91 (dashed area) is rectangular and has a length B<A and a width D<=C. Furthermore, the operative region 91 may be displaced off-center relative to a center of detector surface 43, where the optical axis 45 of the lens 41 intersects the detector surface 43. It may be possible to define the region 91 to be off-centered along both the x and y axis indicated in FIG. 9. However, in the illustrated embodiment, the region 91 is off-centered along the x axis only, and is centered along the y axis. The operative region 91 may be displaced off-center towards the right-hand side edge along the x axis, and may occupy all pixels out to the right-hand side edge but not all pixels towards the left-hand side edge of the detector surface 43. Alternatively, the operative region may be less off-center, and may not include the outermost pixels on the right-hand side of the detector surface 43. Along the y-axis, the operative region 91 may be narrower D than the full width C of detector surface 43, as exemplified in the drawing.

The center of operative region 91 may be the center of the sensing image plane, and a main line of sight 72 may be defined from the center of operative region 91 and the optical center of lens 41. This main line of sight may extend at an acute angle φ to the optical axis 45, where the magnitude of φ may be dependent on the distance between the center of operative region 91 and the optical axis 45. Being acute, angle φ is by definition more than 0° and less than 90°. However, for practical reasons the angle may be in the range of 5-20° or even 5-10°.

As an example, the detector surface 43 may include a 400×400 pixel matrix of image sensors. However, for the purpose of videoconferencing, this may be an excessive amount of pixels. QCIF (Quarter Common Intermediate Format) is a videoconferencing format that specifies data rates of 30 frames per second (fps), with each frame containing 144 rows and 176 pixels per row. This is one fourth the resolution of Full CIF, which defines 355×288 pixels. QCIF support is required by the ITU H.261 videoconferencing standard, and as such only a 176×144 pixel matrix is thus required. This is less than half the accessible number of pixels in each direction. For the purpose of enhancing the image quality it is therefore possible to make use of twice as many rows with twice as many pixels per row, i.e. a CIF, which still fits in the 400×400 matrix.

In some embodiments, an operable region 91 including 355×288 pixels is defined on detector surface 43 including 400×400 pixels, extending inwardly from one side edge of the centered detector surface 43, and centered in along that side edge, as shown in FIG. 9. A 3.2×3.2 mm detector 42 with a pixel pitch of 3.6 μm has a detector surface (A×C) of about 1.44×1.44 mm, and the operable region will have a length B of 288/400×1.44=1.037 mm. The center of the operable region may then be positioned 1.44/2−1.037/2=0.2 mm from the center of the detector surface 43. Assuming the lens 41 is positioned at a height of 1.5 mm from the detector surface 43, the main line of sight 72 will then have an angle of about φ=arctan(0.2/1.5), approximately 7.6°, to the optical axis 45. Using only a QCIF matrix, the corresponding angle would be arctan(1.44*(1−144/400)/(2*1.5)), or approximately 17.1°. However, even if a QCIF image is to be used, it may be possible to make use of the full CIF image plane to enhance the image quality.

It may also be possible to define the operative region by means of a backwards calculation. For example, assuming the camera will be used at a certain angle θ of e.g. 10°, and a QCIF matrix is to be employed. The necessary off-centering Δ of operative area 91, when the distance to the lens is 1.5 mm, is then Δ=1.5 tan(10°), or approximately 0.26 mm. For such a configuration, the operative region 91 will not go all the way out to the edge of detector surface 43; rather, there will be some 55 unused pixel rows at the top of the detector surface 43.

It is to be understood that the numbers presented above are merely given as possible examples, whereas providing an off-centered operable region of a detector surface for the purpose of obtaining a field of view with a main line of sight which is angled with reference to the optical axis of the camera lens, may be applicable to any camera geometry, as schematically illustrated in FIG. 4. The detector 42 may be e.g. a CMOS detector or a CCD detector, and may be a black and white, grey scale or color image detector. Furthermore, the operable region 91 may be specified in hardware or firmware for the camera ISP as an off-center region of interest or window of interest. In some embodiments, the size and position of the operable region 91 may be set as a default value, and thereby always used unless user commands are given to change this setting, e.g. by means of input interface 12.

Figure 10:
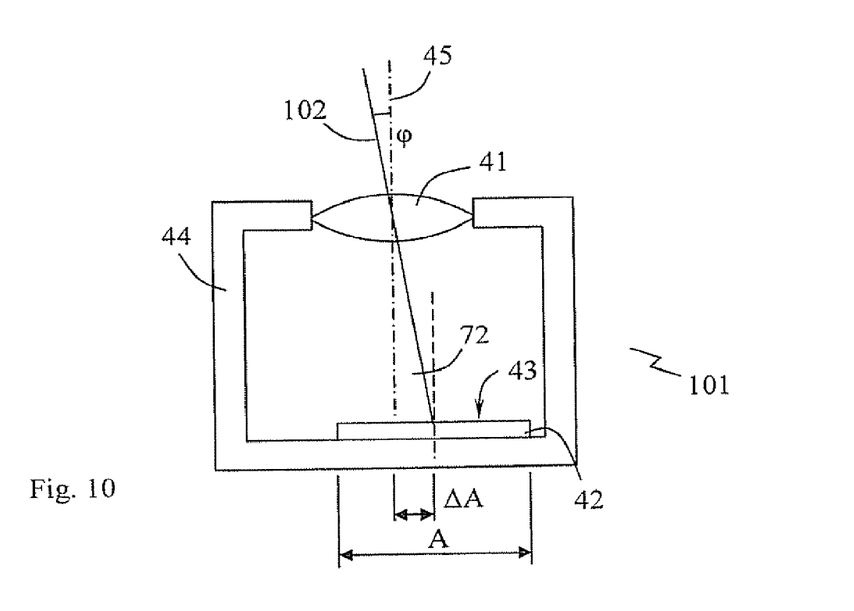
FIGS. 10 and 11 schematically illustrate a digital camera module according to further embodiments of the invention.

FIG. 10 illustrates embodiments which may be provided as an alternative to the embodiments described with reference to FIGS. 8 and 9, or which may be combined with the embodiments of FIGS. 8 and 9. Similar to the camera 14 illustrated in FIG. 4, camera 101 of FIG. 10 includes a lens 41 and a detector 42 with a detector surface 43, suspended parallel to and spaced apart from lens 41 by a support member 44, and potentially an attached ISP (not shown). An optical axis 45 is defined for the lens 41. The detector surface 43 has a length A. However, in this case, the detector 42 may not be placed centrally under the lens 41. Instead, the detector 42 is laterally displaced in relation to the lens 41, such that the optical axis 45 of the lens 41 is displaced off-center with respect to the detector surface 43. In FIG. 10, this is illustrated by the detector 42 being laterally displaced in the support member 44. Alternatively, the lens 41 may instead be laterally displaced in the support member 44.

By this feature, the main line of sight 102 of the field of view for the camera 101, extending from the center of detector surface 43, may extend at an acute angle φ from the optical axis 45, where the magnitude of angle φ is proportional to arctan(ΔA/h), where ΔA is the relative lateral translation and h is the distance between lens 41 and detector surface 43. As an example, if lateral displacement ΔA of the detector 42 is 0.2 mm as indicated in FIG. 10, and the distance between the lens 41 and the detector surface 43 is 1.5 mm, the main line of sight will have an angle φ of about 7.6°.

As indicated, it is possible to combine the embodiments of FIGS. 8 and 9 with the embodiments of FIG. 10, whereby an operable region is defined at the right-hand side of the detector 42, and where the detector 42 is also laterally translated to the right with reference to the lens 41. As an example, consider the example outlined for the embodiment of FIG. 9 with a 400×400 pixel detector surface 43 with a 3.6 μm pixel pitch, arranged 1.5 mm below lens 41, and furthermore a lateral displacement ΔA of detector 42 of 0.2 mm is employed as indicated in FIG. 10.

For a CIF embodiment, the operable region 91 may extend 288 rows inwardly from the side edge of the detector surface 43 which is most remote from optical axis 45. The center of the operable region is then positioned 1.44/2−1.037/2+ 0.2=0.4 mm from the optical axis, which means an angle of about α=arctan(0.4/1.5), or approximately 15°, to optical axis 45. For a QCIF matrix it is possible to have an even larger angle, or alternatively to use the CIF image and scale it to a QCIF.

Figure 11:
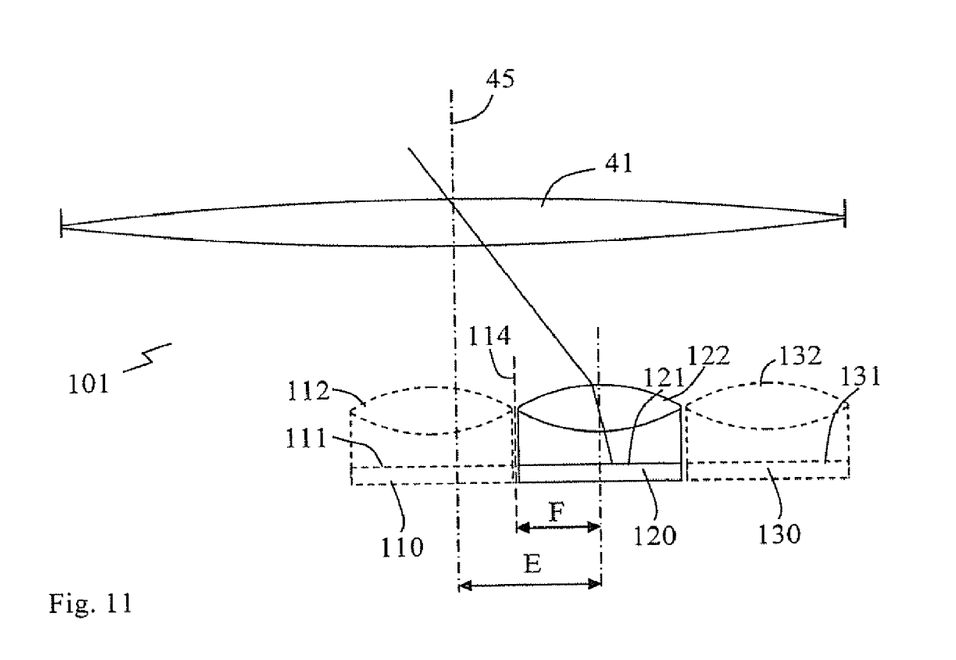

For embodiments in which the detector surface 43 is laterally displaced with respect to the optical axis 45, an improved camera may be obtained by also adapting each pixel element to this off-centered optical geometry. FIG. 11 schematically illustrates certain elements of a camera 110 according to some embodiments of the invention. FIG. 11 illustrates a camera lens 41 and three pixels 110, 120, 130 of a detector 42. A vertical dashed line 114 is shown between pixels 110 and 120, indicating the center of the detector surface 43 of the detector 42, whereas the optical axis 45 intersects the center of the lens 41. Normally, the center of the detector surface 43 and the optical axis 45 may coincide, but according to the embodiments described with reference to FIG. 10 they may be spaced apart by a distance $\Delta A$.

In order to guide incoming light properly to the sensor elements of the detector 42, each pixel may include a sensor including a light sensing element 111, 121, 131, such as a photodiode, and a micro condenser lens 112, 122, 132. The use of micro lenses as a part of an image sensor is a common technology for enhancing the performance of a sensor, as shown in e.g. U.S. Pat. No. 5,251,038. Accordingly, each pixel of detector 42 may include a micro condenser lens on top of the sensor element in order to guide the light rays into the sensor element.

The formation and placement of micro lenses may depend on the chief ray angle of the light bundle striking the sensor. The angle may differ with image height, i.e. the distance from the center optical axis 45 of camera lens 41. Typically, the farther away from optical axis 45 the sensor is positioned, the shorter the focal length of the condenser lens has to be. In a typical configuration, the focal length of the micro lenses increases when moving away from the center of the detector surface 43, and for lens 122, the focal length may be trigonometrically dependent on the distance F to the center 114 of the detector surface 43. However, in the case of embodiments according to FIG. 10 with a translation $\Delta A$, the micro lenses may be adapted to an optical center, still as defined by the optical axis 45, which is no longer the center of the detector surface 43. Therefore, in some embodiments of the invention an intended optical center 45 for the detector surface 43 is defined, which may not coincide with the physical center 114 of the detector surface 43 and which will be the real optical center when it is combined with the lens 41.

The micro lenses of each pixel of the detector surface 43 may then be carefully designed with reference to the defined optical center, typically with increasing focal length as a function of increasing distance to the optical center. The focal length for the lens 122 may be trigonometrically dependent on the distance $E(=F+\Delta A)$ to the optical center, i.e. the optical axis 45. Specific relations are dependent on the overall design of the camera, and the considerations needed to be taken are well known to a person skilled in the art.

As illustrated in FIG. 3, a common way of using e.g. a mobile phone for videoconferencing is at a slight angle to the user's face. However, a distorted perspective will result from the slanted angle between the user's face and the optical axis of the camera. Indeed, this drawback is applicable even when the camera is configured to capture images within a field of view having a main line of sight which is at an angle to the optical axis of the camera, such as in the embodiments described with reference to FIGS. 7-11. As the camera is not held parallel to a user's face, the face is pictured wider in the lower region than in the higher region. The image in FIG. 12 clearly illustrates this effect as the user is holding a rectangular paper in front of the face while capturing an image by using a camera configured according to the embodiment of FIGS. 7-9 with an off-centre image region. This is often called "the keystone effect".

In traditional professional photography this keystone effect can be avoided by the use of special optics, such as shift and tilt lenses, or specially designed cameras with shift and tilt features. In the field of digital image processing, perspective correction is a common feature. Tools such as Adobe® Photoshop provide this feature. Such features can also be used in electronic devices for videoconferencing, such as mobile phones with built-in cameras, for post-processing of images. However, this perspective correction is very demanding on computational power. This is especially a problem with moving images, i.e. video, with many frames per second to process. Post-processing is therefore unsuitable to implement in a system where a mobile phone's main processor 20 is simultaneously used for video encoding and other tasks.

It is also desirable to process an image with a larger resolution and angle coverage than the final image, for the purpose of enhancing image quality. This makes it necessary to transfer a larger image, i.e. more data, from the camera to the host. The host must also handle a non standard image size and convert it to the desired format.

One embodiment comprises the feature of handling perspective correction by the camera's image pipe and image signal processor (ISP). There are several advantages with this design as will be explained below. It is also desirable to use an image sensor and optics that cover a somewhat larger viewing angle than is expected from the final image.

Figure 12:
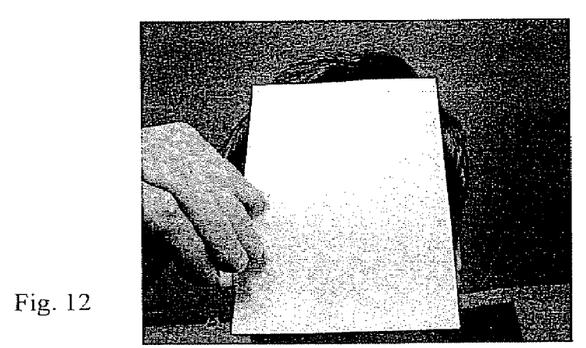
FIG. 12 schematically illustrates a distorted image caused by the camera being held at an angle to a rectangular object.

As can be seen from FIG. 12, the image appears too wide at the bottom compared to the top. To correct this, a principle of perspective correction is implemented where bottom rows of pixels are contracted. In each subsequent row of pixels, a smaller amount of contraction is applied for rows positioned upward in the image. Finally, the top row is least contracted, or not contracted at all. The produced image will be narrower at the bottom than at the top. To avoid this it is necessary to crop the image or, as an alternative, use an over-sized image to start with. In the latter case, the perspective correction process then works on a longer row of image data at the bottom of the image than at the top. The result is an output image from the ISP with squared corners.

One exemplary implementation of the perspective correction mechanism is made in camera hardware or firmware. A typical digital camera module for a mobile camera having an integrated ISP has a scaling function. The scaling function may be implemented as a digital hardware block, or as computer code executed by the processor, or as a combination of hardware and computer code. However, as previously mentioned, it is not necessary that the ISP unit is integrated, it may well be cable-connected to the support member or housing of the camera module. In this sense, the digital camera includes an ISP unit, which comprises the processor and associated ISP software. A typical scaler can be set to scale the image horizontally and vertically. It may be configurable to scale the two dimensions independently. Thus the image can be shrunk in just one dimension leaving the other untouched. The scaler may also be configured to scale the image with a factor n, where n is a floating number, e.g. 1:1.2 etc. In some embodiments, the individual rows are scaled using an interpolation algorithm, e.g. linear interpolation, in order to determine the signal value to output for a certain pixel using the signal values detected in the two neighboring pixels of the row in question.

According to some embodiments, each row of an image is scaled at a scale factor different from the previous and next row. The ISP can calculate the scale factors for each row from an input value of starting and ending scale factors, e.g. first and last row scale factors. The scale factors may be expressed as a ratio given by input row length and desired output row length expressed in number of pixels.

In some embodiments, fixed values of scale factors are used as the use case of video telephony is quite well defined and the angle θ between the user's face and the phone can be estimated with adequate precision. Since the user watches the display on which the image of him- or herself captured by the camera of the electronic device is shown, the user will automatically hold the electronic device such that the image of the face is more or less centered vertically on the display.

Another property of the scaler that may be introduced is centering of the rows. The image can therefore be scaled in such a way that a central vertical line through the input image is retained in the output image. This can be achieved by calculating the starting point for each input row. The pixels before the starting point of each row are neglected as are the trailing pixels. In one embodiment, the starting point of each row is calculated from the following equation:

$$start_n = \frac{l - l_n}{2},$$

where $start_n$ is the first pixel to process in row n; l is the number of pixels in a full row; and ln is the number of pixels to process in row n.

A scaler that is designed to scale the vertical dimension can depend on data storage holding two or more rows of image data. A scaler that is designed to scale the horizontal dimension may use data storage holding a small number of pixels or a whole row of image data. Thus, to make a cost-efficient design, a complete scaler for both dimensions is not necessary if vertical scaling is not necessary for other purposes.

To achieve good image quality the sensor may be designed to have at least four times higher resolution than what is required in the output image, i.e. at least two times the number of pixels in both directions x and y. One example is therefore to use the previously mentioned 400×400 detector for a QCIF output image format. In that case the vertical scaler can be simplified as it only needs two rows of image data for vertical scaling.

Figure 13:
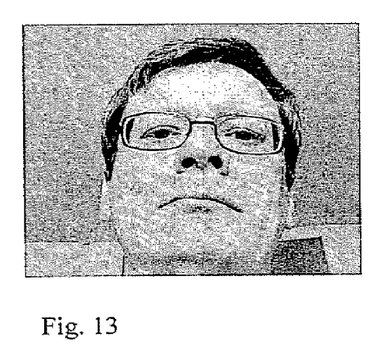
FIGS. 13 and 14 schematically illustrate a distorted image and a corrected image, according to some embodiments of the invention.

FIG. 13 illustrates an image captured of and by a user with a slanting angle θ between the camera's optical axis and the user's face, corresponding to FIG. 3. Even without knowing the true image, it can be noted that the chin portion of the user appears to be wider than in reality, compared to the forehead portion, as the entire image is slanted.

Figure 14:
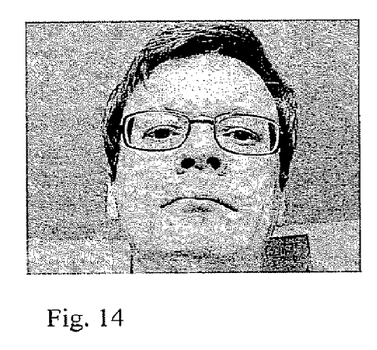

In the image of FIG. 14, though, the distortion effect from the slanting viewing angle has been corrected in accordance with embodiments of the invention, by successively scaling each row or line of pixels to a degree corresponding to the slanting angle θ. Thereby, even though the image of FIG. 14 is slanted, the perspective is correct.

Figure 15:
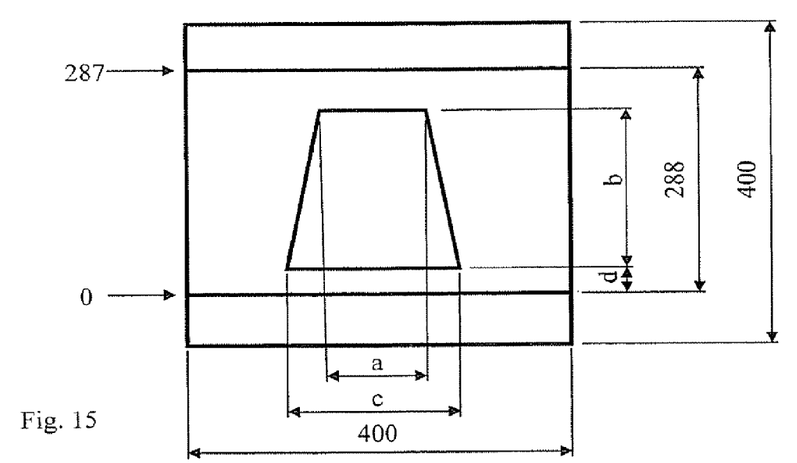
FIG. 15 schematically illustrates an image taken of a rectangular object held at a slanted angle to the detector surface of the camera.

In some embodiments of the invention, an image of a rectangular object of known proportions held at a slanted angle to the camera detector can be used for calculating and setting the scaling factors. Such a setting of the scaling factors may be performed in production, and then be used as a default setting. As an alternative, a user may be able to initiate a setting sequence by means of operating the keypad 12 of the device 10, upon which a rectangular object is held in front of and parallel to the face of the user. The setting sequence can prompt the user to hold an object of known proportions, such as e.g. an A4 sheet or a letter sheet, and to verify via keypad 12 which type of object is used. The camera is then triggered to capture an image of the object, and a software contour detecting application is executed by processor 20 to identify the image of the object, as shown in FIG. 15. Regardless of whether the calculation and setting of scaling factors is performed in production or after sale by a user, further calculations are needed after the contour image has been defined, as is described below with reference to FIG. 15.

FIG. 15 illustrates an image of an A4 paper sheet. In this exemplary embodiment the detector of the camera has 400× 400 pixels, which means that there is room for a CIF image of 355×288 pixels. However, the output image to produce is a QCIF of 176×144 pixels, but instead of using only a QCIF size portion of the detector surface a CIF image is read and scaled down by a factor 2 in both height and width to a QCIF in order to obtain better image quality. An A4 sheet has a height which is the square root of 2 times the width of the sheet. As indicated in FIG. 15, the image of the A4 sheet is b pixel rows high, starting from d rows above a starting row for a CIF image. Furthermore, the image occupies c pixels at the lower edge and a pixels at the upper edge. In order to calculate the scaling factors, a couple of constants must first be defined:

$$j = \frac{1}{\sqrt{2}\frac{2c}{b}};$$

$$i = \frac{jc}{a};$$

$$k = \frac{i-j}{b};$$

$$m = j - kd.$$

For row n, the scaling factor $S_n$ will then be:

$$S_n = m + nk.$$

In some embodiments, only the pixels that will contribute to the QCIF image are read and scaled, in order to minimize computation, which is particularly beneficial for video imaging. Accordingly, the desired output length of each row can be 176 pixels. This means that the length $L_n$ of a row n to scale is $$L_n = \frac{176}{S_n}.$$

As an example, assume that the following values have been detected in the image of FIG. 15, calculated in number of rows for b and d, and number of pixels per row for a c:
a=150,
b=255,
c=200,
d=5.
Using the formulas above, we get the following result:
$S_0$=0.448,
$S_{287}$=0.616
$L_0$=393
$L_{287}$=285
To verify, the scaled width a' of the upper edge of the sheet and the scaled width c' of the lower edge of the sheet can be calculated as follows:
a'=a*$S_{260}$=90,
c'=c*$S_5$=90,
which is consequently a rectangular image. So, the scaling factors for each row n have thereby been calculated and set, and also the number of pixels to process to the scaled image has been determined for each row, for an imaging scenario where a slanting angle θ is used as in FIG. 15. In some embodiments, the slanting angle is not measured or detected when the device is used, instead a certain slanting angle θ is defined as an expected slanting angle to be used when a user operates the device. Typically, the slanting angle may be less than 20°, such as e.g. 10°.

For any subsequent image captured by camera 14, each row n is to be scaled to 176 target pixels, which is 2×88 pixels symmetrically about a vertical centre axis. For a row n, a first target pixel is 88 pixels from the centre axis, and the corresponding position in the detected image is therefore $88/S_n$. This position may not be dead on one particular pixel of the detector surface, from which an image signal value can be retrieved. Instead, an image signal value for that position can be interpolated from the neighboring pixels according to any known scheme. Preferably, intensity level values and color values are separately interpolated. The image signal value(s) obtained is then assigned to the first target pixel in the output image. The next target pixel to assign an image signal value to is then $87/S_n$, and so on until the vertical centre axis has been reached. The other side of the centre axis is processed in the corresponding manner, since the image is symmetrically scaled about that axis. This scaling process is then repeated row by row, until all 288 rows of the target image have been processed.

By performing these steps using the image signal processor of the camera, computation power can be saved and the digital signal processor 20 of the device 10 as such can be used for other purposes. Previously proposed solutions rely on post-processing of the images. Embodiments of the current invention can include processing within the camera image pipeline/ISP. The design described can correct the perspective directly without interfering with the host's processor that is running in a multi-tasking environment. Embodiments of the invention may be particularly suitable for portable devices, such as camera phones, where low weight and compact size are significant market demands. Embodiments of the proposed design further differs from common scaler solutions in the way that each row of pixel data can be scaled with a different factor than other rows in the image array. Embodiments according to the invention can also be designed without any or very little extra hardware such as gates, but most of all without a number of expensive row buffers.

The design is also unique as the scaler can center the image automatically, which may be particularly desirable in a videoconferencing application. A fixed setting for the perspective correction can be used as the video telephony use case is well defined.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A digital camera comprising:
a support structure;
a lens carried by the support structure and having an optical axis;
a detector, carried by the support structure under the lens, the detector comprising a number of adjacent pixel rows, wherein each pixel row comprises a number of pixels, and each pixel includes an image sensor; and
an image signal processor unit directly connected to the detector, the image signal processor unit including an image scaler configured to scale each row of pixels by one of a plurality of respective scale factors, each respective scale factor being different from the scale factor of an adjacent row of pixels, such that the image is processed pixel row by pixel row within the camera image pipeline and each respective scale factor having a magnitude which is proportional to a position of a corresponding row between a start row and an end row.

2. The digital camera of claim 1, wherein the image scaler is configured to be responsive to an input of a start row scale factor and an end row scale factor, and the image scaler comprises a function configured to calculate the respective scale factors for each row between the start row and the end row.

3. The digital camera of claim 1, wherein
the image scaler is configured to calculate an input row length for a pixel row as a ratio between a desired output row length, common to all pixel rows, and the respective scale factor for each row, and
the image scaler is configured to scale image signals detected by the pixels of each row, and which are within the input pixel row length, to the desired output row length.

4. The digital camera of claim 1, wherein
the image scaler is configured to produce an output image with centered rows.

5. The digital camera of claim 4, wherein the image scaler is configured to calculate a centre starting point for each input row from the detector using a formula of:

$$start_n = \frac{l - l_n}{2},$$

where $start_n$ is a first pixel to process in row n; l is a number of pixels in a row; and $l_n$ is a number of pixels to process in row n.

6. The digital camera of claim 1, wherein a camera module is formed by the support structure, and the image signal processor is included in the camera module.

7. The digital camera of claim 1, wherein the image scaler is configured to determine a position in a predetermined image format of an output pixel of a certain pixel row, to determine the corresponding position in the detected image by inverse scaling using the scale factor for the certain pixel row, and to determine an intensity value for the output pixel by interpolation of intensity values as detected by pixels adjacent to the corresponding position in the detected image.

8. The digital camera of claim 1, wherein the image scaler is configured to calculate scale factors depending on a preset expected slanting angle between an image plane of the detector and an object to capture an image therof.

9. The digital camera of claim 1, wherein a field of view of the camera is defined by an operative detector surface region, which is displaced off-center in relation to the optical axis of the lens.

10. The digital camera of claim 1, wherein the image scaler is configured to calculate respective scale factors $S_n$ for each row n through function $S_n=m+n*k$, where m and k are constants.

11. An electronic device comprising
a housing;
a digital camera module including:
a support structure;
a lens carried by the support structure and having an optical axis;
a detector, carried by the support structure under the lens, the detector comprising a number of adjacent pixel rows, wherein each pixel row comprises a number of pixels, and each pixel includes an image sensor; and an image signal processor unit directly connected to the detector, the image signal processor unit including an image scaler configured to scale each row of pixels by one of a plurality of respective scale factors, each respective scale factor being different from the scale factor of an adjacent row of pixels such that the image is processed pixel row by pixel row within the camera image pipeline, and each respective scale factor having a magnitude which is proportional to a position of a corresponding row between a start row and an end row.

12. The electronic device of claim 11, comprising:
a radio signal transceiver; and
a control unit configured to provide a scaled video signal from the digital camera module to the radio signal transceiver.

13. The electronic device of claim 11, comprising
a display configured to present a scaled image as provided by the digital camera module.

14. A method for capturing an image using a digital camera, the method comprising:
aiming the camera at an object;
detecting image signals in a detector comprising a number of adjacent pixel rows, where each pixel row comprises a number of pixels, and each pixel includes an image sensor,
processing the detected image signals pixel row by pixel row within the camera image pipeline by scaling each row of pixels by one of a plurality of respective scale factors, each respective scale factor being different from the scale factor of an adjacent row of pixels and each respective scale factor having a magnitude which is proportional to the position of a corresponding row between a start row and an end row to provide a scaled image; and
outputting the scaled image.

15. The method of claim 14, comprising:
defining a start row scale factor and an end row scale factor; and
calculating the respective scale factors for each row between the start row and the end row.

16. The method of claim 14, comprising:
calculating an input row length for a pixel row as a ratio between desired output row length, common to all pixel rows, and the respective scale factor for each row, and scaling image signals detected by the pixels of each row, and which are within the input pixel row length, to the desired output row length.

17. The method of claim 14, comprising providing a scaled image with centered rows.

18. The method of claim 14, comprising calculating a centre starting point for each input row from the detector using a formula of:

$$start_n = \frac{l - l_n}{2},$$

where $start_n$ is a first pixel to process in row n; l is a number of pixels in a full row; and $l_n$ is a number of pixels to process in row n.

19. The method of claim 14, comprising processing the detected image signals with an image signal processor integral with the digital camera in a camera module of an electronic device.

20. The method of claim 14, comprising transmitting the scaled image to a remote receiver using a radio transceiver of a radio communication terminal.

21. The method of claim 14, comprising presenting the scaled image on a display.

22. The method of claim 14, comprising:
defining an image format;
determining a position in the image format of an output pixel of a certain pixel row;
determining a corresponding position in the detected image by inverse scaling using the scale factor for the certain row; and
determining an intensity value for the output pixel by interpolation of intensity values as detected by pixels adjacent to the corresponding position in the detected image.

23. The method of claim 14, comprising calculating scale factors depending on a preset expected slanting angle between an image plane of the detector and an object to capture an image thereof.

* * * * *

UNITED STATES PATENT AND TRADEMARK OFFICE
CERTIFICATE OF CORRECTION

PATENT NO. : 7,918,614 B2  Page 1 of 1
APPLICATION NO. : 11/482323
DATED : April 5, 2011
INVENTOR(S) : Wernersson It is certified that error appears in the above-identified patent and that said Letters Patent is hereby corrected as shown below:

In the Claims:
Column 15, Claim 1, Line 65: Please correct "row of pixels, such"
to read -- row of pixels such --
Line 67: Please correct "pipeline and" to read -- pipeline, and --

Signed and Sealed this
Ninth Day of August, 2011

David J. Kappos
*Director of the United States Patent and Trademark Office*